Oct. 2, 1962 W. H. REAY ETAL 3,056,769
OLEFIN POLYMERIZATION
Filed Dec. 29, 1958
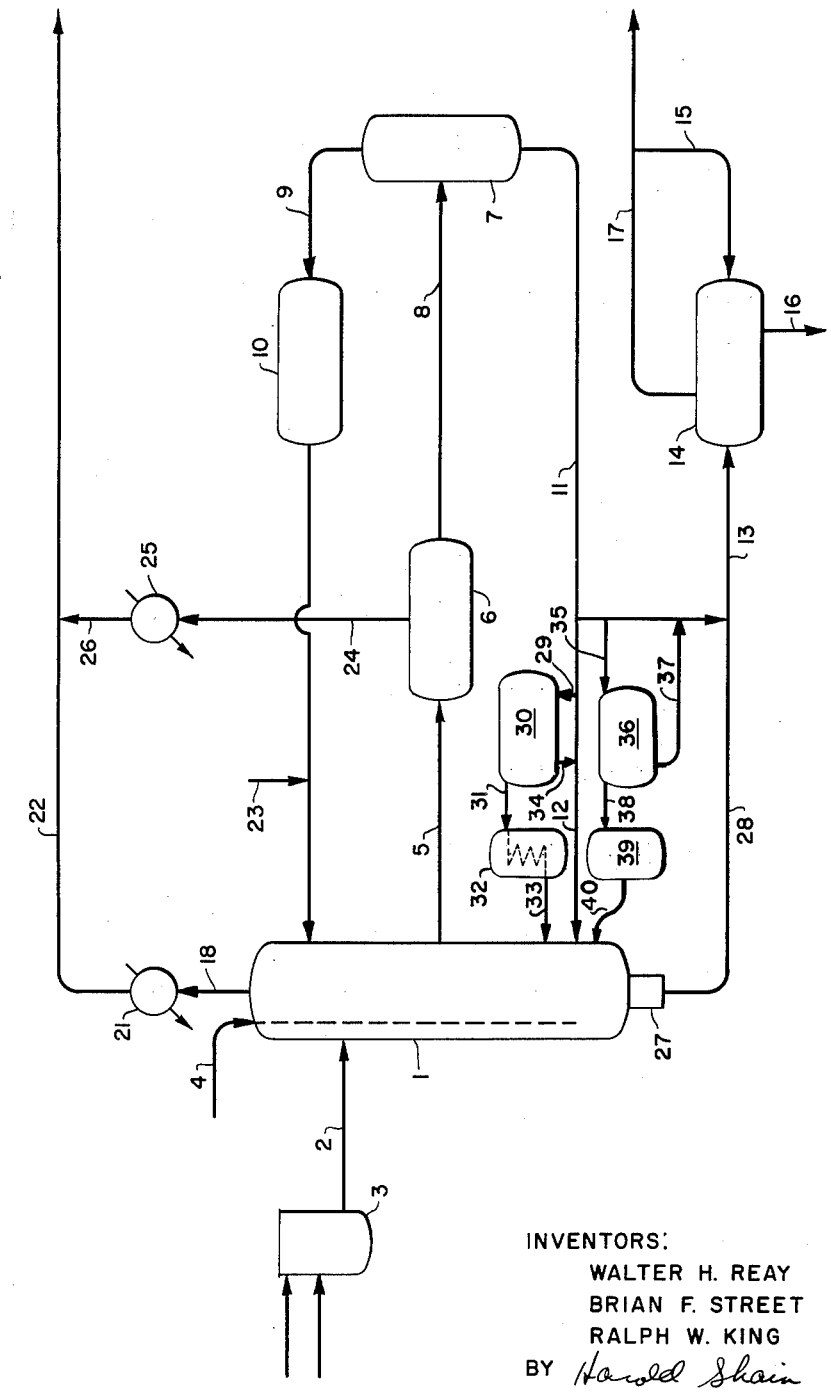
INVENTORS:
 WALTER H. REAY
 BRIAN F. STREET
 RALPH W. KING
BY Harold Shain
 THEIR ATTORNEY

United States Patent Office 3,056,769
Patented Oct. 2, 1962

3,056,769
OLEFIN POLYMERIZATION
Walter H. Reay, Handforth, Chester, Brian F. Street, Upton-by-Chester, and Ralph W. King, Altrincham, England, assignors to Shell Oil Company, a corporation of Delaware
Filed Dec. 29, 1958, Ser. No. 783,606
13 Claims. (Cl. 260—93.7)

This invention relates to improvements in the low-pressure methods for the polymerization of mono-alpha-olefins. More particularly, it relates to improvements in the low pressure polymerization methods of alpha-olefins, whereby production and processing advantages are obtained.

It is known that mono-alpha-olefins, such as ethylene, propylene, butene-1, copolymers thereof, and the like may be polymerized at moderate temperatures and pressures with catalysts formed by admixing a strong reducing agent with a metal compound wherein the metal is selected from the B sub-group of groups IV–VI of the periodic table. The art terms of polymers thus produced "low pressure," "crystalline" or "linear" polymer. The processes for producing these polymers are well known in the art but, briefly, they comprise polymerizing an olefin of the type described at temperatures ranging from about 0° C. to about 120° C. with temperatures in the order of about 25–80° C. being particularly useful. The pressure ranges from about atmospheric pressure to about several atmospheres with pressures in excess of about 500 p.s.i. rarely being employed. The catalyst is simply prepared by mixing the various components whereupon an active catalyst is formed. Preferably, the components are mixed in solutions in inert diluents, or solvents, as heptane, isooctane, benzene, light petroleum fractions, or the like.

The catalyst is normally prepared from at least two components of the type described above. Representative of the metal compound selected from groups IV–VI of the periodic table, there may be mentioned as the more preferred species titanium halides as titanium tetrachloride, titanium trichloride, zirconium tetrachloride, hafnium tetrachloride, vanadium chloride, chromium chloride, tungsten chloride and the like. Still other compounds within this group are well known and need no further description here. The reducing component of the catalyst composition may be any of a variety of reducing agents. Most common among the reducing agents are organo-aluminum compounds as aluminum triethyl, aluminum diethyl chloride, aluminum diethyl hydride, aluminum triisobutyl and related compounds. Many other reducing agents, as lithium aluminum hydride, zinc diethyl and the like are described in the prior art and need no further elaboration here other than to mention that the catalysts are of the now well-known "Ziegler" type.

The low pressure polymerization processes are preferably conducted under conditions that exclude atmospheric impurities such as moisture, oxygen and the like. Additionally, the inert diluent is preferably pretreated to remove harmful impurities such as oxygen, sulfur, moisture, oxygen containing compounds, and the like. After the polymerization is complete, the polymer is recovered by any conventional means, the most common of which includes destroying the catalyst by washing the polymer with a compound that reacts with, and inactivates, the catalyst. Such compounds include, for example, lower alcohols as methanol, acetone, and the like. Thereafter the polymer is separated from the diluent and is washed a few times and dried.

One of the difficulties encountered in the low pressure polymerization processes is that the reactions are accompanied by the evolution of a considerable amount of heat and it has not been heretofore either simple or economic to provide adequate means for dissipating the heat. As it happens, it is essential to provide adequate means for dissipating the heat created during low pressure polymerizations and failure to do so can result in various complications one of which is that uniform polymer is difficult to obtain.

It is an object of this invention to provide improvements in the low pressure processes for the polymerization of mono-alpha-olefins. More particularly, it is an object of this invention to provide improvements in the dissipation of heat of reaction in the low pressure polymerizations of alpha-olefins. Another object of this invention is to provide such improvements which are simple, effective, and economical. Yet another object of this invention is to provide improvements in the low pressure polymerizations of alpha-olefins whereby increased production is easily accomplished, as will be seen hereinafter. Other objects will become apparent as the description of the invention proceeds.

These and other objects are accomplished in the low pressure processes for the polymerization of mono-alpha-olefins by the improvement comprising withdrawing a part of the polymerization slurry from the reactor, dividing said slurry into portions as follows: (1) a liquid fraction comprising a portion of the diluent of the polymerization and being substantially free of solid polymer, cooling said liquid fraction and returning it to the reactor, and (2) a polymer slurry, the polymer slurry being divided into a major and a minor portion, the major portion being returned to the reactor and the minor portion being treated to recover the polymer. Other embodiments of the invention permits the major portion to be concentrated by separating part of the diluent and cooling said diluent before returning it to the reactor. When such an embodiment is employed, the concentrated slurry is passed directly to the reactor without external cooling. By still another embodiment of this invention, both the major portion and minor portion are concentrated by the withdrawal of diluent and that diluent is cooled and returned the reactor, the remaining concentrate from the major portion be returned directly to the reactor and the concentrate from the minor portion being treated to recover the polymer. Still other modifications will be described hereinafter.

The present improvements will be seen to be a substantial departure from the prior art methods for dissipating the heat generated during the low pressure methods for the polymerization of mono-alpha-olefins. In the past, the techniques used to dissipate the heat of reaction comprised any of several conventional means, such as equipping the polymerization reactor with internal cooling coils and/or providing the reactor with a cooling jacket. Another technique comprised drawing off from the reactor a polymer slurry and recovering the polymer from the slurry and returning the diluent to the reactor. These prior techniques, which may have been used in combination, met with varying degrees of success because certain problems were created which do not exist in the present invention. For one thing, the use of cooling coils within the reactor hindered the establishment of uniform conditions throughout the reactor. Further, they attract deposits of the polymer which are difficult to remove. Such deposits operate as an insulator and thereby reduce the heat transfer capacity of the coils. The use of a jacketed reactor also has certain disadvantages such as tending to attract deposits of the polymer on the internal walls of the reactor and thereby hinders heat transfer. The technique of cooling and recirculating a portion of the diluent is effective but is limiting in that it requires larger equipment in order to provide adequate heat dissipation capacity. Alternatively, the polymerization reactor would not be operated at a maximum capacity and thereby cause less heat to be generated. The present invention overcomes all of the disadvantages described above and will be seen to provide still other advantages not afforded by the prior art.

FIG. 1 is a schematic flow diagram which will presently be used to illustrate the operation of the present invention.

One of the principal advantages of the present invention is that of increasing the throughput with a given reactor as a result of being able to effectively dissipate the heat of reaction. Still another advantage of the present invention is that considerable economies may be affected in the amount of diluent and catalysts used. This advantage is of considerable importance particularly as it relates to the economies in the amount of the diluent used because it usually happens that the diluent is ultimately reused after the polymer is recovered. In such cases, the diluent is contaminated with various impurities including the alcohol, as indicated above, which is used to destroy the activity of the catalyst. However, before the diluent can be reused, it is necessary to separate it from the alcohol and other impurities. This is most conveniently accomplished by fractionating the diluent from the alcohol. It also happens that this fractionation is a rather costly operation and with the use of lesser amounts of the diluent, substantial savings in overall operating costs will be experienced.

Although the present invention may be suitably adopted for batch operations, it is most advantageously applied to large, continuous operations. In the latter type of operation, the liquid in the reactor when equilibrium is established is primarily the inert hydrocarbon diluent containing a suspension or slurry of polymer together with the catalyst mixture which may be in solution or partly in suspension. The liquid also contains a small amount of unpolymerized monomer and/or polymer of low molecular weight. The concentration of solid polymer in the reactor should not be too high as difficulties in effective agitation within the reactor may arise. Generally, in carrying out the present invention the solids content of the polymer in the reactor may be up to 30%, by weight, and more conveniently within the range of 10 to 20%.

Referring to the drawing the reactor 1, or polymerization vessel, may be equipped with an agitator (not shown). The polymerization is carried out in a liquid reaction medium comprising a dispersion of the low pressure catalyst in a solvent, or diluent. The catalyst contained in the diluent is fed into the reactor 1 from line 2 having been first prepared in the premixer 3. Monomer enters the reactor through line 4 which preferably extends into the reactor, shown by the dotted line and preferably below the liquid level within the reactor. The monomer to be polymerized may be either in a substantially pure form or it may be mixed with gaseous inert hydrocarbons such as methane, ethane, propane, or the like. The reactor 1 is of conventional design and may, if desired have an external cooling jacket (not shown) through which a heat exchange medium, as water, is circulated. The cooling jacket provides only a small part of the cooling required. The polymer slurry is drawn from the reactor 1 through line 5 to a holding tank 6 and then to a separator 7 through line 8. In the separator 7 the polymer slurry is separated into a solvent fraction which is returned to the reactor through line 9 after being cooled in heat exchanger 10. A concentrated slurry is withdrawn from the concentrator 7 through line 11. The concentrated slurry withdrawn at this time usually contains about 30–45 percent by weight of solid polymer and preferably contains about 40 percent by weight. This slurry is then divided into two portions, a major portion which is returned to the reactor through line 12 and a minor portion that passes through line 13 to a catalyst decomposition vessel 14 for the catalyst decomposition step. The catalyst decomposition step is the first stage of the work-up procedure whereby the polymer is recovered.

The catalyst decomposition step according to the present invention is preferably carried out by contacting the polymer slurry with ethanol vapor at temperatures in the order of 70 to 80° C. although vapors of other alochols may be employed. The use of vaporous alcohols has the advantage that it more effectively contacts the active catalyst thereby inactivating it. The alcoholic vapors are passed countercurrent to the direction of flow of the polymer slurry and enters the vessel 14 through line 15 and leaves through line 17. The thus treated polymer leaves the vessel 14 through line 16 for the next stage of work-up. Spent alcoholic vapor together with hydrocarbon diluent that is flashed off by the alcohol is removed through line 17 where the mixture is treated to recover the alchol and diluent or is recycled in part.

The vessel 14 is advantageously an enclosed enamelled iron trough having a Hastelloy double worm screw for moving the polymer towards the outlet line 16 and advantageously it is provided with a heating jacket so that hot alcohol supplied as such or in admixture with polymerization diluent through line 15 is boiled in contact with the polymer thereby reaching catalyst components held in the polymer pores and forming soluble catalyst decomposition products which are readily washed out into the liquid phase. Spent alcohol and hydrocarbon diluent is removed at the entry end of the vessel 14 through line 17 and returned, if desired with an intermediate purification.

The reactor 1 is provided with a vent line 18 leading to condenser 21. The vent line and condenser function to afford still additional cooling facilities by carrying out the polymerization with an excess of the olefin to be polymerized and this excess, which enters through line 4, sweeps diluent vapor through line 18 to the condenser 21 where the vaporized diluent is condensed and then falls back to the reactor. The remaining monomer and small amounts of diluent that are not recovered in the condenser 21 passed through line 22 to a recovery unit (not shown) prior to being reused.

During the course of the operation according to the present invention diluent, of course, is lost by being removed mainly in the working-up stages. Additional diluent may be conveniently added to the system through a line such as 23 placed in a location where the added solvent also functions to assist in the overall cooling.

The holding tank generally shown by 6 actually is a piece of optional apparatus but its employment permits several advantages to be obtained and therefore is recommended. For one thing it permits greater production since it permits the withdrawn polymer slurry to stand under a pressure below that in the reactor for a period sufficient to permit unreacted monomer to polymerize or to be flashed off for removal through vent line 24 then to condenser 25 followed by passage to a recovery unit (not shown) through line 26. Another advantage of the holding tank is that it reduces very substantially the formation of materials, as low molecular weight polymer, that may tend to form harmful deposits in the separator 7, the cooler 10, and other apparatus. The holding tank 6 in the drawing is a diagrammatic representation but in practice it may comprise any suitable holding vessel or pair of vessels disposed in parallel for alternate operation.

The separator 7 may be any conventional piece of apparatus with a continuous centrifuge or a hydrocyclone being preferred. The heat exchanger 10 may comprise a number of cooled tubes ranged in parallel between headers or one or more elongated tubes each comprising straight sections interconnected by return bends and disposed in a cooling medium.

The unit 27, at the bottom of the reactor 1, is a disintegrator which enables the removal of large pieces of polymer that may build up from time to time in the reactor.

This polymer is passed directly to decomposition vessel 14 through line 28.

The invention may be practiced by withdrawing a slurry of the reaction mixture from the reactor 1 through line 5. As previously indicated the hold tank 6 is optional and may or may not be used. If it is not used the slurry passes into the separator 7 which preferably is a centrifuge or hydrocyclone and a concentrated slurry is withdrawn from the concentrator through line 11 while diluent that is substantially free of polymer is withdrawn through line 9 and then passed through a heat exchanger 10 where it is cooled before being returned to the reactor 1. Without the holding tank 6, it would be desirable to place a vent in the separator 7 to permit removal of residual monomer. The concentrated slurry withdrawn from line 11 is divided into two unequal portions, the small portion being passed through line 13 for subsequent working-up and polymer recovery. The major portion is returned to the reactor 1 through line 12. Another procedure comprises passing the major slurry portion contained in line 12 through a heat exchanger (not shown) before returning the slurry to the reactor 1. By another modification, the above-described major and minor portions are separated from one another and concentrated. The major portion passes by means of line 29 through separator 30, wherein solvent is removed through line 31, sent through cooler 32 and thereafter by means of line 33 back to reactor 1. The concentrated major portion then passes by means of line 34 from the separator to line 12 and thence back to the reactor 1. The minor portion is concentrated by passing from line 11 and line 35 into separator 36. Solvent is removed therefrom by means of line 38 and is cooled in cooler 39, passing therefrom by means of line 40 back to reactor 1. The concentrated minor portion then passes by means of line 37 from separator 36 into line 13 and thence into vessel 14. When this embodiment is employed the polymer concentrate of the major portion is not normally passed through a heat exchanger. Still other embodiments of the present invention include the combination of cooling as described above and auxiliary cooling by using a jacketed reactor, feeding fresh diluent to the reactor through line 23, or by employing an excess of monomer over that required for the polymerization so that some of the excess is condensed, cooled and returned to the reactor 1.

The fresh diluent that is added through line 23 may join the diluent from separator 7 and line 9 at any point but an added advantage is obtained if it is located somewhat removed from the reactor 1. The advantage is that the fresh diluent receives an additional purification treatment by the soluble catalyst in the diluent coming from the separator 7. This is effected by a reaction between impurities that may be contained in the diluent with soluble catalyst in the stream contained in line 9.

The extent to which the polymer slurry is concentrated at 7 may vary widely and is governed mainly by the handling properties of the concentrated slurry during the work-up stages. In most cases the concentrate withdrawn at 11 is generally limited to about 40% solids. It may, of course, be substantially less but best efficiency is experienced at about 40% solids. By operating in this manner, much less diluent is present during the initial work-up stages where it becomes contaminated with impurities such as alcohols and water which requires removal before the diluent can be reused. By way of illustration assume, for example, that a 10% slurry is initially withdrawn from the reactor and then concentrated to about a 20% slurry by removal of about 5/9 of the diluent. There is then less than half the quantity of diluent to be purified per unit weight of the polymer withdrawn compared with a case where the 10% slurry is worked-up in its entirety. Similarly, by concentrating to a 40% slurry, only 15 parts of the original 90 parts of the diluent are required to be purified.

The amount of the concentrated slurry to be returned to the reactor may be varied a good deal and is governed primarily by the necessity of maintaining the ratio of soluble to insoluble components of the catalyst mixture within the reactor. Normally, the ratio does not exceed about 3:1 and in many cases is in the order 2:1 depending upon the choice of the catalyst components and the nature of the polymer to be produced. This may be illustrated, for example, by assuming that a 10% slurry which is withdrawn from the reactor is concentrated to 20% by the removal of 5/9 of the diluent and the diluent then being returned to the reactor after cooling. If half the concentrated slurry is returned to the reactor, 7/9 of the soluble catalyst component and 50% of the insoluble catalyst components are returned to the reactor so that the ratio of soluble to insoluble components becomes slightly more than 1.5 to 1 in a batch process and higher in a continuous process.

A surprising finding is that the increase in the relative proportion of soluble catalyst components is acceptable and even advantageous providing the initial molar ratio of the reducing agent to the metal compound be increased. This is illustrated by batch experiments in which the catalyst is formed by admixing, as the catalyst components, aluminum diethyl chloride and titanium tetrachloride in an inert hydrocarbon petroleum fraction at a concentration of .5 mmole of aluminum per liter and with an aluminum to titanium molar ratio of .5. This catalyst composition is used to polymerize ethylene and there is obtained 30 grams of polyethylene having an intrinsic viscosity of 1.85. Two equal quantities of the same catalyst were next prepared. One sample was filtered and the filtrate added to the other quantity and the resulting catalyst in which the amount of soluble catalyst component had been doubled in relation to the insoluble component was then used to polymerize ethylene under the same conditions as the previous polymerization. The yield was 40 grams of polyethylene having an intrinsic viscosity of 1.1.

In other experiments the concentration of aluminum was increased to 10 mmoles per liter and the ratio of soluble to insoluble catalyst components were doubled in the same manner described above. The molar ratio of aluminum to titanium was varied to give the results shown in the following table:

| Al/Ti ratio | Yield of polymer, parts by weight | I. V. |
| --- | --- | --- |
| 0.5 | 41 | 1.1 |
| 0.75 | 38 | 1.6 |
| 0.85 | 40 | 1.8 |
| 1.0 | 28 | 2.3 |

In carrying out the improvements of the present invention, the separation of the diluent from the polymer slurry may be conducted by any means such as employing a centrifuge, a hydrocyclone or even settling. Settling has the attraction of being simple but has certain disadvantages for the purpose of the present invention. Thus, it may tend to give a poor distribution of catalyst with excess of insoluble catalyst components in the settling vessel and will generally require a rather sizeable vessel in order to affect suitable settling. Accordingly, a centrifuge or hydrocyclone is much preferred.

The present invention is described in greater detail in the following examples.

*Example I*

A glass-lined reactor having a useful capacity of 150 gallons of liquid and fitted with a stirrer is charged with a solvent which is a mineral oil distillate, having an initial boiling point of 88–95° C. and a final boiling point of 105° C., containing a mixture of 5 mmoles per liter each of aluminum diethyl monochloride and titanium tetrachloride. Ethylene is then fed in at a point near the base of the reactor at a rate of 30 lbs. per hour and solvent-containing catalyst mixture in the proportions just indicated is fed in at the rate of 24 gallons per hour. When steady conditions of polymerization are reached the temperature of the slurry in the reactor is 70° C. and its content of polyethylene is 13.5% by weight and this slurry is withdrawn at the rate of 158 gallons per hour. Of the slurry withdrawn, 130 gallons per hour are passed through a heat exchanger, consisting of 12 feet of ½" internal diameter jacketed stainless steel tube, and cooled to 55° C. and then returned to the reactor. Twenty-eight gallons per hour of slurry are concentrated to 24% by weight by the elimination of an amount of solvent approximately equal to 41% of the solvent present in the slurry treated. This eliminated solvent is returned to the reactor. The concentrated slurry is passed on for working-up.

*Example II*

A glass lined reactor fitted with a stirrer and having a useful liquid capacity of 14,500 gallons is charged with kerosene as the solvent and the same catalyst mixture as in Example I at the same concentration. Ethylene is then fed in at the rate of 3,600 lbs. per hour together with kerosene containing catalyst mixture in the same proportion as in Example I at the rate of 2,400 gallons per hour. When steady conditions are reached the temperature of the slurry in the reactor is 70° and its content of polyethylene is 10% by weight. Of this slurry, 228,000 lbs. per hour are withdrawn and passed at once to a hydrocyclone from which 114,000 lbs. per hour of solvent are passed to a heat exchanger and cooled to 30° C. and then returned to the reactor. The concentrated slurry produced by the hydrocyclone has a polyethylene content of 20% and 97,500 lbs. per hour of this concentrated slurry is returned to the reactor and 16,500 lbs. per hour are passed on for working-up. The first stage of working-up comprises a continuous centrifuge to which kerosene for washing the polyethylene is fed at the rate of 2,200 lbs. per hour and from which 11,000 lbs. per hour of kerosene are withdrawn. This quantity of solvent is also passed through the heat exchanger and thence to the reactor.

*Example III*

The procedure of Example I is repeated except that propylene is polymerized with a catalyst prepared from equivalent amounts of aluminum tripropyl and vanadium trichloride. Additionally, excess propylene is continuously vented and condensed together with entrained diluent and the mixture is returned to the reactor. This added cooling operation permits a faster through-put of recirculating diluent from the hydrocyclone.

The present invention will be seen to be capable of many variations which are not described in great detail here. This is particularly the case as it relates to catalyst choice and the concentration of the slurries that are involved. It will thus be appreciated that the slurry recovered from the hydrocyclone may be as low as 5% solids and even higher than 40% solids. The higher solids may be handled by increasing the size of the conduits and making other appropriate changes. The present inventive processes have another advantage in that various changes in overall design may be easily made to suit individual production preferences and these changes can be calculated by a chemical engineer. By way of illustration, if it is desired to use existing apparatus having capacities different from those in Example II, the amount of heat generated, the amount of diluent to be separated, the degree to which it is to be cooled, the required concentration of slurry to be returned to the reactor and all related operations can be calculated with a high degree of accuracy as will be understood by a skilled chemical engineer.

We claim as our invention:

1. In the process for polymerizing a monoalpha-olefin with a heavy metal catalyst formed by admixing an organo-aluminum compound and a halide of a group IVB metal in an inert hydrocarbon diluent, the improvement comprising withdrawing a part of the polymer slurry from the reactor, dividing said slurry into portions as follows: (1) a liquid fraction comprising a portion of the diluent of the polymerization, said liquid being substantially free of solid polymer, cooling the said liquid fraction and returning it to the reactor, and (2) a concentrated polymer slurry containing less than half the diluent in the polymer slurry withdrawn from the reactor, the polymer slurry being divided into a major portion and a minor portion, the major portion being return to the reactor and the minor portion being treated to recover the polymer.

2. The improvement of claim 1 wherein the said major portion is concentrated by separating part of the diluent thereof, cooling the said diluent and returning it to the reactor and returning to the reactor, without cooling, the remaining slurry.

3. The improvement of claim 1 wherein the said major portion and the said minor portion are concentrated by separating parts of their diluents, respectively, cooling the diluents and returning them to the reactor, the concentrate from the said major portion being returned to the reactor and the concentrate from the said minor portion being treated to recover the polymer.

4. The improvement of claim 1 wherein incoming diluent is added to the said liquid fraction before it is returned to the reactor.

5. The improvement of claim 1 wherein the withdrawn polymer slurry is passed through a holding tank before being divided into the said portions.

6. In the process for the polymerization of a monoalphaolefin with a heavy metal catalyst formed by admixing an organo-aluminum compound and a halide of a group IVB metal in an inert hydrocarbon diluent, the improvement comprising the combination of steps A and B as follows: (A) withdrawing a part of the polymer slurry from the reactor, dividing said slurry into portions as follows: (1) a liquid fraction comprising a portion of the diluent of the polymerization, said liquid being substantially free of solid polymer, cooling the said liquid fraction and returning it to the reactor, and (2) a concentrated polymer slurry containing less than half the diluent in the polymer slurry withdrawn from the reactor, the polymer slurry being divided into a major portion and a minor portion, the major portion being returned to the reactor and the minor portion being treated to recover the polymers, and (B) venting excess monomer from the reactor, said monomer containing entrained diluent, a portion of said vented monomer and entrained diluent being condensed and returned to the reactor.

7. The improvement of claim 6 wherein the said major portion is concentrated by separating part of the diluent thereof, cooling the said diluent and returning it to the reactor and returning to the reactor, without cooling, the remaining slurry.

8. The improvement of claim 6 wherein the said major portion and the said minor portion are concentrated by separating parts of their diluents, respectively, cooling the diluents and returning them to the reactor, the concentrate from the said major portion being returned to the reactor and the concentrate from the said minor portion being treated to recover the polymer.

9. The improvement of claim 1 wherein the mono-alpha-olefin is ethylene and the polymer is polyethylene.

10. The improvement of claim 1 wherein the mono-alpha-olefin is propylene and the polymer is polypropylene.

11. The improvement of claim 1 wherein the catalyst is formed by admixing an aluminum alkyl chloride and a titanium halide.

12. The improvement of claim 1 wherein the catalyst is formed by admixing aluminum diethyl chloride and titanium tetrachloride.

13. In the process for polymerizing ethylene with a mixture of aluminum diethyl monochloride and titanium tetrachloride in the presence of a mineral oil distillate having an initial boiling point of 88–95° C. and a final boiling point of about 105° C. at a reaction temperature of about 70° C., the improvement comprising withdrawing from the reactor a part of the polymer slurry containing about 10% by weight of polyethylene, dividing that slurry into portions as follows: (1) a liquid fraction comprising a portion of the hydrocarbon diluent of the polymerization, said diluent being substantially free of solid polymer, cooling the diluent to a temperature of about 30° C. and returning it to the reactor, and (2) a concentrated polyethylene slurry containing about 20% by weight of polyethylene and containing less than half of the diluent in the polymer slurry withdrawn from the reactor the polyethylene slurry being divided into a major portion and a minor portion, the major portion being returned to the reactor and the minor portion being treated to recover the polymer.

References Cited in the file of this patent

UNITED STATES PATENTS

| | | |
|---|---|---|
| 2,685,577 | Cerveny et al. | Aug. 3, 1954 |
| 2,755,324 | Mueller | July 17, 1956 |
| 2,825,721 | Hogan | Mar. 4, 1958 |
| 2,838,477 | Roelen et al. | June 10, 1958 |
| 2,845,414 | Schutze | July 29, 1958 |
| 2,856,393 | Goering | Oct. 14, 1958 |
| 2,880,201 | Peters et al. | Mar. 31, 1959 |
| 2,885,389 | Schappert | May 5, 1959 |